Nov. 25, 1924.
J. H. EVANS
1,516,999
LIQUID LEVEL INDICATOR
Filed Aug. 11, 1923
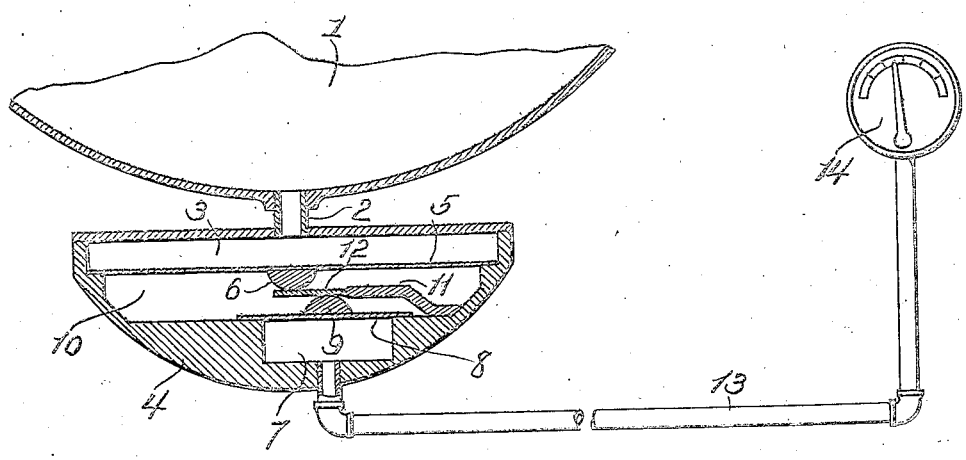
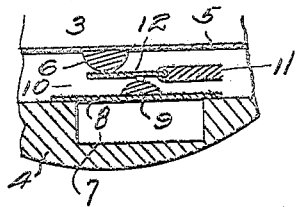
Inventor
J. H. Evans
By Seymour & Bright
Attorneys Patented Nov. 25, 1924.

1,516,999

UNITED STATES PATENT OFFICE.

JAMES HOWARD EVANS, OF LEXINGTON, KENTUCKY.

LIQUID-LEVEL INDICATOR.

Application filed August 11, 1923. Serial No. 656,953.

*To all whom it may concern:*

Be it known that I, JAMES HOWARD EVANS, a citizen of the United States, and resident of Lexington, in the county of Fayette and State of Kentucky, have invented certain new and useful Improvements in Liquid-Level Indicators; and I do hereby declare the following to be a full, clear, and exact description of the invention, such as will enable others skilled in the art to which it appertains to make and use the same.

This invention relates to tank indicators and is designed primarily to provide an indicator upon the instrument board of an automobile whereby the chauffeur may be informed at all times of the state of his fuel supply. The invention, however, is applicable to all cases where it is desired to know the quantity of liquid in a distant tank or reservoir. One object of my invention is to provide a simple mechanism operated by the liquid itself to accurately indicate the quantity of liquid in the tank and which may be readily installed on any vehicle whatever may be the distance or difference in height between the tank and the instrument board, and another object is to provide novel means whereby the pressure of the liquid in the tank will actuate the indicator.

One embodiment of the invention is illustrated in the accompanying drawing in which Fig. 1 is a view showing an indicator conventionally with a portion of a tank and the actuating devices between the same and the indicator in section. Fig. 2 is a detail showing the pivotal mounting of the lever.

In the drawing, 1 designates a portion of a gasoline tank which may be of any form or capacity. In the bottom of the tank is secured a nipple 2 which establishes communication between the tank and the upper chamber 3 of a fluid-pressure container or casing 4. The bottom of the chamber 3 consists of a flexible diaphragm 5 which extends entirely across the casing 4 and has its edges firmly secured to or in the wall of the casing in any leak-proof manner. On the under side of the diaphragm 5, I provide a knob, plate or other projection 6 which serves as a pressure-transmitting element and also as a guard against wear upon the diaphragm by the member which is set in motion by it. In the bottom wall of the casing 4 is a chamber 7 the top of which is a second diaphragm 8 provided on its upper side with a projection or knob 9 similar to the element 6, and it may be here noted that while I have shown the diaphragm 8 as of less diameter than the upper diaphragm 5 the diaphragms may be of the same size or of any preferred proportions. In the chamber 10 between the two diaphragms is a bracket 11 of any convenient form and pivoted to this bracket is a lever 12 extending between and in contact with the members 6 and 9. A tube 13 leads from the bottom of the chamber 7 to an indicator 14 which may be conveniently a Bourdon pressure gage calibrated to show quantity of gasoline. The tube 13, of course, may be of any length and may be made to follow any line necessitated by any given circumstances but it must be leak-proof, and the indicator 14 may be secured upon the instrument board of the vehicle in any convenient manner.

It is thought the operation will be readily understood. The tube 13 and the chamber 7 is filled with any preferred pressure transmitting medium and a closed pressure circuit is thus established having its terminals in the said chamber and the indicator. The static pressure or weight of the gasoline or other liquid in the tank 1 will act directly on the upper diaphragm 5 to depress the same, the pressure being transmitted to the lower diaphragm through the lever 12 or other connection so as to be multiplied and applied through and by the lower diaphragm to the fluid in the chamber 7 and the tube 13 which fluid constitutes a medium for transmitting the pressure to the indicator and actuating the latter. As the liquid is drawn from the tank or reservoir, the pressure upon the diaphragms is reduced so that they tend to return to the normal flat condition, thereby relieving the pressure in the closed pressure circuit and causing the indicator to give a lower reading.

My improved device is extremely sensitive so that it responds instantly to the variations in the quantity of fuel. It is simple and compact in construction and may be easily installed wherever its use is desired.

Having fully described my invention what I claim as new and desire to secure by Letters-Patent, is:—

A liquid level indicator comprising in combination with a tank, a casing in constant communication with the tank, upper and lower flexible diaphragms secured in spaced relation across the casing, the upper diaphragm sustaining pressure from the liquid in the tank and the two diaphragms with the walls of the casing defining a closed chamber between the diaphragms, a gage, a closed pressure circuit connecting the gage and the space below the lower diaphragm, a bracket in the closed chamber between the diaphragms, projections on the opposed faces of the diaphragms, and a lever pivoted at one end upon the bracket and extending therefrom between and in contact with the projections on the diaphragms, said projections being out of alinement.

In testimony whereof, I have signed this specification in the presence of two subscribing witnesses.

JAMES HOWARD EVANS.

Witnesses:
TILFORD C. WILSON,
GEORGIA BOND.